United States Patent Office 3,252,313
Patented May 24, 1966

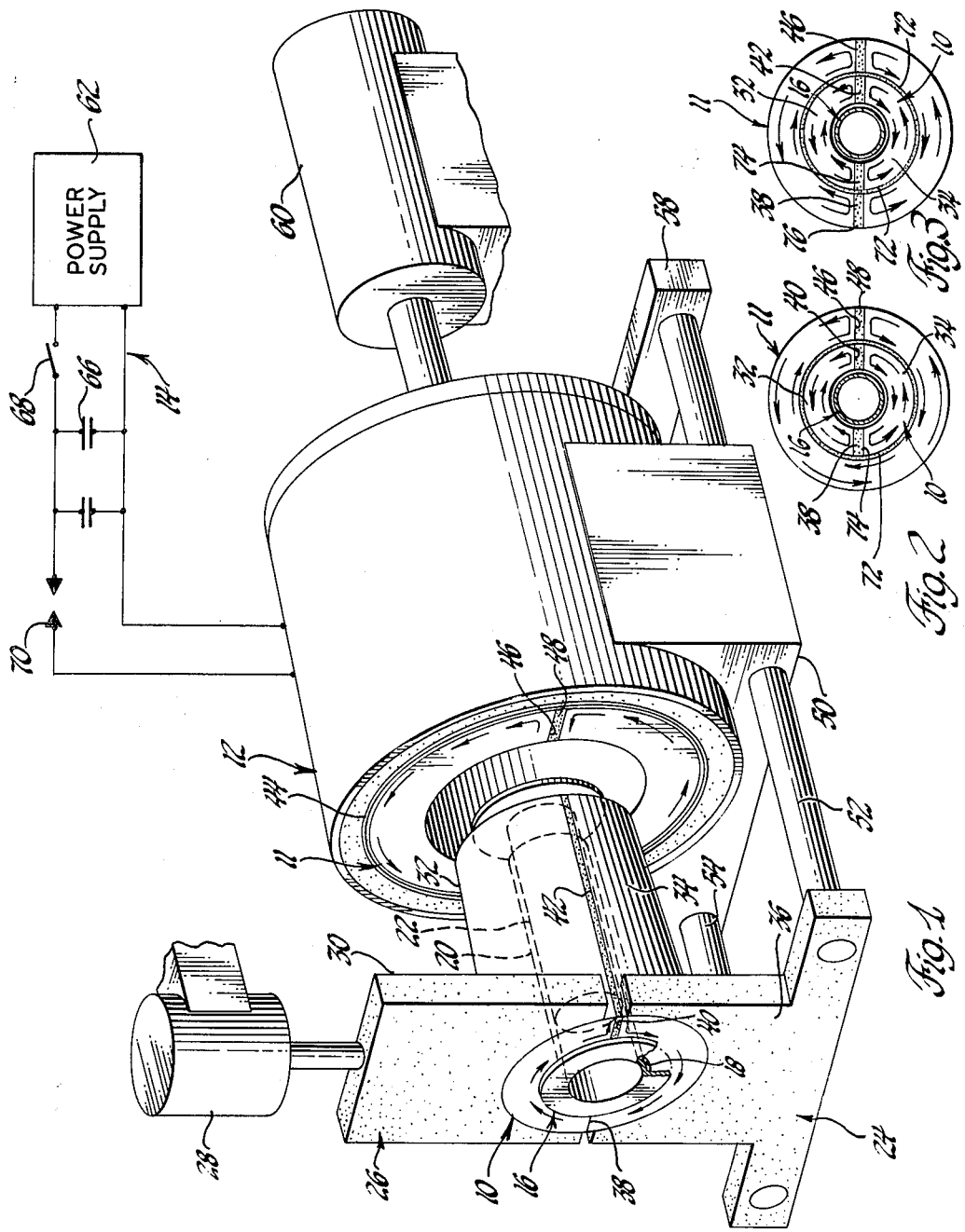

3,252,313
ELECTROMAGNETIC FORMING METHOD AND APPARATUS
Mark A. Eilers, Warren, and Winlaw B. Bramley, Jr., Milford, Mich., assignors to General Motors Corporation, Detroit, Mich., a corporation of Delaware
Filed Dec. 21, 1964, Ser. No. 419,667
17 Claims. (Cl. 72—56)

This invention relates to improved method and apparatus for electromagnetically forming metallic workpieces.

The electromagnetic forming process involves the use of a forming coil, which surrounds the workpiece in the area to be magnetically formed. A high amperage current pulse is supplied to the forming coil and this generates a magnetic field of high intensity. The resultant magnetic pressures act against the workpiece and produce the desired forming. To render the process more efficient, it is customary to use a flux concentrator, which functions to intensify the magnetic field, particularly in the area where forming is to occur. As can be appreciated, if a workpiece has an irregular shape or it cannot be installed within the flux concentrator or disassembled when withdrawn, then the process cannot be used. An example of this latter problem occurs when two parts are joined each of which has an end flange larger in diameter than the inside diameter of the flux concentrator.

To overcome these problems and others, novel method and apparatus are proposed employing a flux concentrator with relatively movable parts that define a workspace for the workpiece when engaged. A further unique provision is made not only for maneuvering the flux concentrator and a conductor relative to each other but also for establishing an operative relationship therebetween so that the subsequent energization of the conductor will generate the required forming forces.

The foregoing and other objects and advantages of the invention will become apparent from the following description and the accompanying drawing in which:

FIGURE 1 is a schematic illustration of magnetic forming apparatus incorporating the principles of the invention, and FIGURES 2 and 3 are schematic illustrations of modifications of the apparatus.

Referring now to the drawing in more detail, the numeral 10 denotes generally a movable flux concentrator, the numeral 11 a fixed flux concentrator, the numeral 12 a magnetic forming coil, and the numeral 14 a high amperage current pulse source. A workpiece viewed generally at 16 is inserted within a workspace 18 defined by the movable flux concentrator 10 when in depicted assembled or engaged position. The workpiece 16 consists of two similar parts 20 and 22 each with a large end flange of a diameter greater than that of the workspace 18. Both parts 20 and 22 are cylindrically shaped with the part 22 being of a smaller diameter and slidable within the part 20. With the workpiece 16 in place, the movable flux concentrator 10 and the forming coil 12 including the fixed flux concentrator are moved relative to each other until in a surrounding relationship with the movable and fixed flux concentrators in engagement along their outside and inside diameters, respectively, and then the source 14 is activated to energize the forming coil 12. The forming coil 12 provides in a way well known a high intensity magnetic field, which is further intensified by the flux concentrators 10 and 11 to create the magnetic pressures required to join the workpiece parts 20 and 22, i.e., clamp part 20 to part 22. If needed, a mandrel (not shown) may be inserted inside the workpiece.

The movable flux concentrator 10 consists of a fixed section 24 and a movable section 26. The movable section 26 is maneuvered up and down or to and from the engaged position with respect to the fixed section 24 by any suitable motor 28, such as some kind of an electrically operated linear motor. The movable section 26 includes a bracket 30 that interconnects the motor 28 with a shell 32 of highly conductive material such as copper. The shell 32 and the bracket 30 are insulated from each other in any appropriate way or the bracket itself can be formed of some type of nonconductive material; e.g., an epoxy filled fiber glass. The fixed section 24 has a similar shell 34 of this same highly conductive material and a bracket 36. The bracket 36 and the shell 34 also either are insulated from each other or the bracket 36 is made of some nonconductive material as the bracket 30.

As explained, the motor 28 moves the movable section 26 to and from its illustrated position, to define the workspace 18, which is shown as cylindrical to conform to the corresponding shape of the workpiece 16. Along a dividing line 38 between the sections 24 and 26, an electrical contact is maintained in this embodiment. On the opposite side, a slot 40 is provided and has therein an insulating strip 42 that may be attached to either section. The purpose of this slot 40 is to provide the current path illustrated by the lines with the arrows. The fixed flux concentrator 11 is also formed of a highly conductive material and includes a slot 46 for the same purpose as the slot 40. Hence, they are aligned and the slot 46 is provided with an insulating strip 48. Preferably the external diameter of the flux concentrator 10 and the inside diameter of the flux concentrator 11 are tapered so that intimate contact can be maintained therebetween.

The forming coil 12 may be of any suitable construction and include an appropriately backed winding 44 of whatever number of turns are required to produce the required magnetic field. The winding 44 may have any winding configuration, such as helical, and have whatever cross-sectional shape is needed for a particular application; e.g., round, square, rectangular, etc.

The forming coil 12 is attached to a slide 50 that is in turn slidable on two rails 52 and 54. These rails 52 and 54 at one end are joined to the fixed section 24 of the flux concentrator 10 and at the other end to a support 58. Another motor 60, which also may be an electrically operated linear motor, is drive connected to the forming coil 12 and functions to move the forming coil 12 on the guide rails 52 and 54 to and from an operative position in which it surrounds the flux concentrator 10.

The source 14 includes a high voltage power supply 62, a capacitor bank 66, a manually operable switch 68 and a spark gap 70. These are suggested merely for demonstration purposes because many other equivalents can be used as will readily occur to those versed in the art. For instance, instead of the capacitor bank 66, a motor-generator set or some other suitable pulse source may be used. The spark gap 70 can be replaced by a similarly performing device such as a thyratron or an ignitron.

In operation, when the manually operable switch 68 is closed, current at the voltage of the power supply, e.g., 10 kilovolts, is supplied to the capacitor bank 66. The capacitor bank 66 will then charge to some predetermined voltage, which will break down the spark gap 70. When the spark gap 70 becomes ionized, a current pulse of a high amperage, such as 100,000 amperes, is supplied to the forming coil 12. The pulse has a duration of only a few microseconds; hence, the forming coil 12 will develop a very large magnetomotive force and accordingly a high intensity magnetic field.

Explaining now briefly the cycle of operation, it will be assumed that the forming coil 12 is in its illustrated position and that the movable section of the movable flux concentrator 10 is in its raised position. A workpiece 18 comprising the two unattached parts 20 and 22 is positioned as shown in the fixed section 24 of the flux concentrator 10. The motor 28 is actuated to move the movable section 26 into engagement with the fixed section 24 and to the illustrated position. Next, the motor 60 is operated to move the forming coil 12 leftwardly until the movable and fixed flux concentrators 10 and 11 are engaged and their slots 40 and 47 respectively aligned. In this position the winding 44 surrounds the area of the workpiece 16 to be formed. The forming coil 12 now can be energized by closing the manually operable switch 68. The resultant high amperage current pulse in the winding 44 will develop an intense magnetic field that will in turn induce current flow in the movable and fixed flux concentrators 10 and 11, which effectively function as a unit so that the current will flow around the aforementioned path in a direction of the arrows. Of course, this direction can be reversed merely by changing the winding 44 or the direction of the current pulse as is well understood. Actually in effect the flux concentrators 10 and 11 serve as a single-turn secondary and the winding 44 is a multiple-turn primary if more than one turn is used. This will produce a step down in the voltage and an increase in the current. Consequently, the current flow along the inside diameter of the movable flux concentrator 10 in addition to being increased is concentrated within a smaller area and therefore the current density in this smaller area will be substantially increased. As a result of this increased current density, a more intense magnetic field is produced and concentrated over this smaller area so as to develop a considerably greater magnetic pressure for forming the workpiece 18.

The FIGURE 2 and the FIGURE 3 modifications both employ an insulating strip 72 between the outside diameter of the movable flux concentrator 10 and the inside diameter of the fixed flux concentrator 11 so that, in effect, a 1:1 coupling is made therebetween. The strip 72 precludes the need for a precise fit therebetween as is demanded with the FIGURE 1 construction. Moreover, arcing, which could occur with the FIGURE 1 construction either when the tapered fit is improper or the power demand is great, is avoided. Of course, the strip 72 must be affixed securely to one of the diameters so that the relative movement therebetween does not tear the strip 72 and also the material of the strip 72 must be of such a type as to be able to withstand the heat that is generated.

Considering first the FIGURE 2 modification, the parting line 38 additionally includes an insulating strip 74. Therefore, with the energization of the winding 44 assumed to generate current in the fixed flux concentrator 11 in the directions of the arrows, the current flow induced thereby in the two shells 32 and 34 of the movable flux concentrator 10 will be in the marked directions.

In the FIGURE 3 modification, the fixed flux concentrator 11 includes an insulating strip 76 next to and aligned with the insulating strip 74 in the movable flux concentrator 10. This strip 76 will divide the fixed flux concentrator 11 into two parts and the current flow in each will be indicated assuming that the winding 44 is energized in the same way as in FIGURE 2. Consequently, the direction of current flow in the two shells 32 and 34 of the movable flux concentrator 10 will be also the same and, of course, produce the corresponding magnetic fields. The insulating strip 72 now becomes optional.

Although both a movable flux concentrator 10 and a fixed flux concentrator 11 have been shown and described, it is possible to eliminate the fixed flux concentrator 11 in some instances where the forming coil 12 itself meets the rigidity requirements of a particular application. For example, the rigidity afforded by the fixed flux concentrator 11 may be achieved, at least partially, by employing a spirally wound forming coil 12. Also, the forming coil 12 if needed could be appropriately backed as well as wound in a spiral configuration.

The invention is to be limited only by the following claims.

We claim:

1. Apparatus for electromagnetically forming a metallic workpiece comprising a flux concentrator defining a workspace for the workpiece, a conductor so shaped as to induce when energized a current in the flux concentrator in the operative positions thereof, means maneuvering the flux concentrator and the conductor relative to each other and to the operative positions thereof, and means energizing the conductor so as to develop a high intensity magnetic field which is intensified within the workspace by the flux concentrator so as to impose a forming force on the workpiece.

2. Apparatus for electromagnetically forming a metallic workpiece comprising in combination, a flux concentrator having relatively movable and engaging members adapted when engaged to define a workspace for the workpiece, means maneuvering the members into and out of engagement, a conductor so shaped as to induce when energized a current in the flux concentrator in the operative positions thereof, means maneuvering the flux concentrator and the conductor relative to each other and to the operative positions thereof, and means energizing the conductor so as to develop a high intensity magnetic field that is intensified within the working space by the flux concentrator.

3. Apparatus for electromagnetically forming a metallic workpiece comprising a flux concentrator having relatively movable and engageable members each provided with a forming surface together defining a workspace for the workpiece when the members are engaged, means maneuvering the members into and out of engagement, a forming coil so shaped as to induce when energized a current in the flux concentrator in the operative positions thereof, guide means so arranged relative to the flux concentrator and the forming coil as to provide a guide therefor, means maneuvering the forming coil on the guide means and to the operative position, and means energizing the forming coil so as to develop a high intensity magnetic field that is intensified within the workspace by the flux concentrator.

4. Apparatus for electromagnetically forming a metallic workpiece comprising a flux concentrator having fixed and movable members so shaped as to when engaged define a cylindrical workspace for the workpiece, motor means drive connected to the movable member for moving the movable member into and out of engagement with the fixed member, a guide rail joined to the fixed member, a forming coil slidable on the guide rail and shaped so as to receive and surround the flux concentrator in an operative position thereof, means moving the forming coil to and from the operative position thereof, and means energizing the forming coil so as to develop a high intensity magnetic field that is intensified within the working space by the flux concentrator.

5. Apparatus for magnetically forming a metallic workpiece comprising in combination, a flux concentrator having inside and outside parts, the inside part having relatively movable and engageable members each provided with a forming surface defining a workspace for the workpiece when the members are engaged, means maneuvering the members into and out of engagement, a conductor joined to the outside part of the flux concentrator, means maneuvering the conductor and the outside part of the flux concentrator to and from an operative position in which the outside and inside parts of the flux concentrator are in a surrounding relationship, and means energizing the conductor in the operative position thereof so as to develop a high intensity magnetic field that is intensified within the workspace by the flux concentrator.

6. Apparatus for electromagnetically forming a metallic workpiece comprising a cylindrical flux concentrator having inside and outside parts slidable together and into an electrical contacting relationship in which the inside and the outside parts are concentrically arranged in an operative position, the inside part having relatively movable and engageable members defining a workspace for the workpiece when the members are engaged, both the inside and outside parts of the flux concentrator having radial slots therein, the radial slots being aligned when the parts are together, means maneuvering the members into and out of engagement so as to permit the workpieces to be installed within and removed from the workspace, a forming coil joined to and surrounding the outside part of the flux concentrator, means maneuvering the inside and the outside parts of the flux concentrator relative to each other and to and from the operative position, and means energizing the forming coil so as to induce a current flow in the flux concentrator and thereby develop a magnetic field of high intensity in the workspace for magnetically forming the workpiece to a desired shape.

7. Apparatus for electromagnetically forming a metallic workpiece comprising a flux concentrator having inside and outside parts slidable together and into a concentrically arranged operative position, the inside and outside parts being electrically isolated from each other, the inside part having relatively movable and engageable members electrically isolated from each other and defining a workspace for the workpiece when the members are engaged, means maneuvering the members into and out of engagement so as to permit the workpieces to be installed within and removed from the workspace, a forming coil joined to and surrounding the outside part of the flux concentrator, means maneuvering the inside and the outside parts of the flux concentrator relative to each other and to and from the operative position, and means energizing the forming coil so as to induce a current flow in the inside part of the flux concentrator, the current flow in the inside part of the flux concentrator inducing current flows in each of the members in a direction that develops magnetic fields that are additive within the workspace.

8. Apparatus for electromagnetically forming a metallic workpiece comprising a flux concentrator having inside and outside parts slidable together and into a concentrically arranged operative position, the parts having complementary tapered surfaces so as to be in electrical contacting engagement in the operative position thereof, the inside part having relatively movable and engageable members defining a workspace for the workpiece when engaged, both the inside and the outside parts of the flux concentrator having radial slots therein, the radial slots being aligned when the parts are together, motor means drive connected to one of the members and operative to move the one member into and out of engagement with the other member, a guide rail secured to the other member, a forming coil joined to and surrounding the outside part of the flux concentrator, the forming coil and the outside part being slidable on the guide rail, motor means maneuvering the forming coil and the outside part on the guide rail to and from the operative position of the inside and outside parts, and means energizing the forming coil so as to develop a high intensity magnetic field that is intensified within the workspace by the flux concentrator.

9. Apparatus for electromagnetically forming a metallic workpiece comprising a flux concentrator having inside and outside parts slidable together and to a concentrically arranged operative position, the parts having complementary tapered surfaces so as to be in electrical contacting engagement in the operative position thereof, the inside part having a fixed member and a movable member, the members being engageable and so shaped as to define a cylindrical workspace for the workpiece, both the inside and the outside parts of the flux concentrator having radial slots therein, the radial slots each having an insulating material therein and being aligned when the parts are together, motor means drive connected to the movable member and operative to move the movable member into and out of engagement with the fixed member, a guide rail secured to the fixed member, a forming coil joined to and surrounding the outside part of the flux concentrator, the forming coil and the outside part being slidable on the guide rail, motor means maneuvering the forming coil and the outside part on the guide rail to and from the operative position of the inside and outside parts of the flux concentrator, and means energizing the forming coil so as to develop a high intensity magnetic field that is intensified within the workspace by the flux concentrator.

10. Apparatus for electromagnetically forming a metallic workpiece comprising a flux concentrator having inside and outside parts slidable together and into a concentrically arranged operative position, means electrically insulating the parts from each other in the operative position, the outside part having a slot therein provided with an insulating material, the inside part having relatively movable members defining a workspace for the workpiece when together, means electrically isolating the members from each other when together, means maneuvering the members together and apart so as to permit the workpieces to be installed within and removed from the workspace, a forming coil joined to and surrounding the outside part of the flux concentrator, means maneuvering the inside and the outside parts of the flux concentrator relative to each other and to and from the operative position, and means energizing the forming coil so as to induce a current in the outside part of the flux concentrator, the induced current flow in the outside part of the flux concentrator inducing a current flow in the inside part of the flux concentrator so as to develop a high intensity magnetic field within the workspace.

11. Apparatus for electromagnetically forming a metallic workpiece comprising a cylindrical flux concentrator having inside and outside parts slidable together and into a concentrically arranged operative position, means insulating the parts from each other, the outside part having a radial slot therein provided with an insulating material, the inside part having a fixed member and a movable member defining when together a cylindrical workspace for the workpiece, means insulating the inside and outside parts from each other when together, the latter insulating means being aligned with the radial slot in the outside part, motor means drive connected to the movable member and operative to move the movable member until the members are together and to retract the movable member, a guide rail secured to the fixed member, a forming coil joined to and surrounding the outside part of the flux concentrator, the forming coil and the outside part being slidable on the guide rail, motor means maneuvering the forming coil and the outside part on the guide rail to and from the operative position of the inside and outside parts, and means energizing the forming coil so as to induce a current in the outside part, the current induced in the outside part in turn inducing the current in the outside part so as to develop a high intensity magnetic field within the workspace for forming the workpiece.

12. Apparatus for electromagnetically forming a metallic workpiece comprising a flux concentrator having inside and outside parts slidable together and into a concentrically arranged operative position, means electrically isolating the parts from each other, the outside part having two symmetrical sections electrically isolated from each other, the inside part having relatively movable members insulated from each other and engageable to define a workspace for the workpiece, means maneuvering the members into and out of engagement so as to permit the workpieces to be installed within and removed from the workspace, means drive connected to one of the members and operative to move the one member into and out of engagement with the other member, a guide rail secured to the other member, a forming coil joined to and surrounding the outside part of the flux concentrator, the forming coil and the outside part being slidable on the guide rail, means maneuvering the forming coil and the outside part on the guide rail to and from the operative position of the inside and outside parts, and means energizing the forming coil so as to induce a current in both sections of the outside part, the members being so aligned relative to the sections as to have a current induced in each of the members by the current induced in the sections thereby generating a high intensity magnetic field within the workspace for forming the workpiece.

13. Apparatus for electromagnetically forming a metallic workpiece comprising a cylindrical flux concentrator having inside and outside parts slidable together and into a concentrically arranged operative position, means insulating the inside and outside parts from each other, the outside part having two symmetrical sections, means electrically isolating the sections from each other, the inside part having a fixed member and a movable member together defining a cylindrical workspace for the workpiece, means electrically isolating the two members from each other when together, motor means drive connected to the movable member and operative to move the movable member into and out of engagement with the fixed member, a guide rail secured to the fixed member, a forming coil joined to and surrounding the outside part of the flux concentrator, the forming coil and the outside part being slidable on the guide rail, motor means maneuvering the forming coil and the outside part on the guide rail to and from the operative position of the inside and outside part, means energizing the forming coil so as to induce a current in each of the sections of the outside part of the flux concentrator, the fixed and movable members of the inside part being so aligned relative to each of the sections of the outside part as to have currents induced in each by the currents in the sections thereby developing a high intensity magnetic field within the workspace for forming the workpiece.

14. A method of electromagnetically forming a metallic workpiece comprising the steps of enclosing the workpiece within a pair of relatively movable parts of a flux concentrator, moving a forming coil and the flux concentrator relative to each and into an operative relationship, and energizing the forming coil so as to develop a high intensity magnetic field that is intensified by the flux concentrator so as to exert a forming force on the workpiece.

15. A method of electromagnetically forming a metallic workpiece comprising the steps of installing a workpiece within a fixed section of an inside part of a flux concentrator, moving a movable section of the inside part of the flux concentrator into engagement with the fixed section so as to define a workspace for the workpiece, moving an assemblage including an outside part of the flux concentrator with a conductor wound thereon and the inside part of the flux concentrator relative to each other and into a concentric electrical contacting relationship, and energizing the conductor so as to induce a current flow in the flux concentrator and thereby develop a high intensity magnetic field within the workspace for forming the workpiece.

16. A method of electromagnetically forming a metallic workpiece comprising the steps of installing a workpiece within a workspace defined by two relatively movable sections of an inside part of a flux concentrator, moving the sections together, moving an outside part of the flux concentrator with a conductor wound thereon and the inside part of the flux concentrator relative to each other and into a concentric electrically isolated relationship, and energizing the conductor so as to induce a current in the outside part of the flux concentrator and in turn induce a current in the inside part of the flux concentrator thereby developing a high intensity magnetic field within the workspace for forming the workpiece.

17. A method of electromagnetically forming a metallic workpiece comprising the steps of installing a workpiece within a workspace defined by two relatively movable sections of an inside part of a flux concentrator, moving the sections together, moving an outside part of the flux concentrator with a conductor wound thereon and also formed in two symmetrical and electrically isolated sections and the inside part of the flux concentrator relative to each other and into a concentric electrically isolated relationship, and energizing the conductor so as to induce a current in the outside part of the flux concentrator and in turn induce a current in the inside part of the flux concentrator thereby developing a high intensity magnetic field within the workspace for forming the workpiece.

References Cited by the Examiner

UNITED STATES PATENTS

| | | | |
|---|---|---|---|
| 2,976,907 | 3/1961 | Harvey et al. | 72—56 |
| 3,136,033 | 6/1964 | Hansen | 29—421 X |
| 3,175,383 | 3/1965 | Levine | 72—56 |

JOHN F. CAMPBELL, *Primary Examiner.*

THOMAS H. EAGER, *Examiner.*